(12) United States Patent
Crumrine

(10) Patent No.: US 10,383,457 B2
(45) Date of Patent: Aug. 20, 2019

(54) PORTABLE AND COLLAPSIBLE DEVICE AND METHODS

(71) Applicant: Guava Family, Inc., Solana Beach, CA (US)

(72) Inventor: Scott Crumrine, Solana Beach, CA (US)

(73) Assignee: Guava Family, Inc., Solana Beach, CA (US)

(*) Notice: Subject to any disclaimer, the term of this patent is extended or adjusted under 35 U.S.C. 154(b) by 326 days.

(21) Appl. No.: 14/028,392

(22) Filed: Sep. 16, 2013

(65) Prior Publication Data

US 2014/0075670 A1 Mar. 20, 2014

Related U.S. Application Data

(60) Provisional application No. 61/701,576, filed on Sep. 14, 2012.

(51) Int. Cl.
*A47D 13/06* (2006.01)
*A47D 7/00* (2006.01)
(Continued)

(52) U.S. Cl.
CPC .......... *A47D 13/061* (2013.01); *A01K 1/0035* (2013.01); *A23C 9/137* (2013.01);
(Continued)

(58) Field of Classification Search
CPC .... A47D 13/06; A47D 13/061; A47D 13/063; A47D 13/065; A47D 13/066;
(Continued)

(56) References Cited

U.S. PATENT DOCUMENTS 2,901,755 A * 9/1959 Wood, Jr. ............. A47D 11/007
5/100
2,992,441 A * 7/1961 Landry ................ A47D 13/063
5/154
(Continued)

FOREIGN PATENT DOCUMENTS

CN 2170040 Y 6/1994
CN 2217343 Y 1/1996
(Continued)

OTHER PUBLICATIONS

PCT Search Report and Written Opinion dated Oct. 30, 2013, for PCT application No. PCT/US2013/060008.

*Primary Examiner* — Nicholas F Polito
*Assistant Examiner* — Amanda L Bailey
(74) *Attorney, Agent, or Firm* — Mintz Levin Cohn Ferris Glovsky and Popeo, P.C.

(57) ABSTRACT

Disclosed is a collapsible device which can provide at least partial containment for one or more objects, including a child or animal, and which can collapse or fold into a compact configuration in order to allow for improved portability of the collapsible device. In some implementations, the collapsible device can include a collapsible frame and at least one flexible material component that can be reversibly secured to the collapsible frame. In addition, some implementations can include a foldable base or at least one adaptable feature.

12 Claims, 11 Drawing Sheets

(51) Int. Cl.
  *A47D 9/00* (2006.01)
  *A01K 1/00* (2006.01)
  *A23C 9/13* (2006.01)
  *A23C 9/137* (2006.01)

(52) U.S. Cl.
  CPC ............ *A23C 9/1322* (2013.01); *A47D 7/002* (2013.01); *A47D 9/005* (2013.01); *A47D 13/063* (2013.01); *A23V 2002/00* (2013.01); *A23V 2200/214* (2013.01); *A23V 2250/50722* (2013.01); *A23V 2250/5424* (2013.01)

(58) Field of Classification Search
  CPC ........ A47D 13/068; A47D 7/00; A47D 7/002; A47D 7/005
  See application file for complete search history.

(56) References Cited

U.S. PATENT DOCUMENTS

| | | | |
|---|---|---|---|
| 4,070,716 A | 1/1978 | Satt et al. | |
| 4,376,318 A * | 3/1983 | Cirillo | A47D 13/063 5/114 |
| 4,651,367 A * | 3/1987 | Osher | A47D 7/002 5/99.1 |
| 5,363,521 A * | 11/1994 | Garland | A47D 13/063 5/98.1 |
| 5,615,427 A * | 4/1997 | Huang | A47D 13/063 5/98.1 |
| 5,727,265 A * | 3/1998 | Ziegler | A47D 13/063 5/93.1 |
| 2008/0034498 A1 | 2/2008 | Chen et al. | |
| 2009/0144896 A1 | 6/2009 | Chen et al. | |
| 2013/0097785 A1* | 4/2013 | Cicci | A47D 15/008 5/663 |

FOREIGN PATENT DOCUMENTS

| | | |
|---|---|---|
| CN | 2626318 Y | 7/2004 |
| EP | 1880642 A1 | 1/2008 |
| GB | 2283670 A | 5/1995 |
| WO | WO-20060135299 A1 | 12/2006 |

\* cited by examiner

PORTABLE AND COLLAPSIBLE DEVICE AND METHODS

REFERENCE TO PRIORITY DOCUMENT

This application claims the benefit of priority under 35 U.S.C. § 119(e) of U.S. Provisional Patent Application Ser. No. 61/701,576 filed Sep. 14, 2012 under 37 C.F.R. § 1.78(a). Priority of the filing date is hereby claimed and the full disclosure of the aforementioned application is incorporated herein by reference.

FIELD

The subject matter described herein relates to devices and methods related to a collapsible device having a collapsible frame body that can adapt at least one of a flexible material component and an adaptable feature for a variety of uses, including providing at least partial containment.

BACKGROUND

A standard infant bed, or crib, can provide a safe and secure sleeping area for a child. However, standard infant beds can be large and difficult to transport. In addition, it is common for children to want or need to sleep while away from the home where the infant bed is stored. As such, parents of children may find it difficult to provide a safe and secure sleeping area for their child when away from the home.

SUMMARY

Disclosed herein are devices and methods related to a collapsible device. Some implementations disclosed herein include a collapsible device providing at least partial containment. The collapsible device can include a collapsible frame body having a continuous rail with at least one continuous rail joint that segments the continuous rail and allows at least the continuous rail to transition between a collapsed and an extended configuration. In addition, the collapsible frame can further include an extension extending from the continuous rail. Additionally, the extension can have an extension joint that allows the extension to transition between a collapsed configuration and an extended configuration. The collapsible device can further include a flexible material component configured to reversibly secure to at least a part of the collapsible frame body and provide the at least partial containment and a foldable base configured to reversibly mate with the flexible material.

Some implementations of methods disclosed herein include providing a collapsible device that can provide at least partial containment. The collapsible device can include a collapsible frame body having a continuous rail with at least one continuous rail joint that segments the continuous rail and allows at least the continuous rail to transition between a collapsed and an extended configuration. In addition, the collapsible frame can further include an extension extending from the continuous rail. Additionally, the extension can have an extension joint that allows the extension to transition between a collapsed configuration and an extended configuration. The collapsible device can further include a flexible material component configured to reversibly secure to at least a part of the collapsible frame body and provide the at least partial containment and a foldable base configured to reversibly mate with the flexible material. Furthermore, the method can include expanding the collapsible frame and extension.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This disclosure describes a collapsible device which can provide at least partial containment for one or more objects, including a child or animal, and which can collapse or fold into a compact configuration in order to allow for improved portability of the collapsible device. In some implementations of the present subject matter, the collapsible device can include a collapsible frame and at least one flexible material component that can be reversibly secured to the collapsible frame and can assist in providing partial containment or enclosure. In addition, some implementations of the present subject matter can include a foldable or collapsible base which can provide a support along at least one side of the containment provided by the collapsible device.

In some implementations of the present subject matter, the collapsible frame can be configured to allow a variety of adaptable elements to be adapted to the collapsible frame. For example, the collapsible frame can include one or more legs or extensions which can be configured to permanently or reversibly adapt one or more adaptable features, such as rocker adapters or various foot adapters, which can allow the collapsible device to have a variety of functions and characteristics, as will be discussed in greater detail below.

In addition, some implementations of collapsible device can include one or more joints or hinges that can allow the collapsible device to configure into a variety of configurations, including collapsed configurations. Additionally, the joints can have a variety of ranges of motion, including some joints with restricted or limited ranges of motions. Furthermore, one or more joints can include a locking feature, such as a user-activated locking feature, which can allow a user to lock the locking feature such that the corresponding joint has no range of motion, or unlock the locking feature such that the corresponding joint has a defined or variable range of motion.

The collapsible device disclosed herein can be used for a variety of containment purposes, such as for a baby bed or crib, a bassinet, a dog kennel, or the like. In addition, some implementations of the collapsible device can be used for non-containment purposes, including a platform for other products such as a portable table or other type of platform. However, it has been contemplated that the collapsible device can be used for a variety of uses and is not limited to the examples provided herein.

Figure 1:
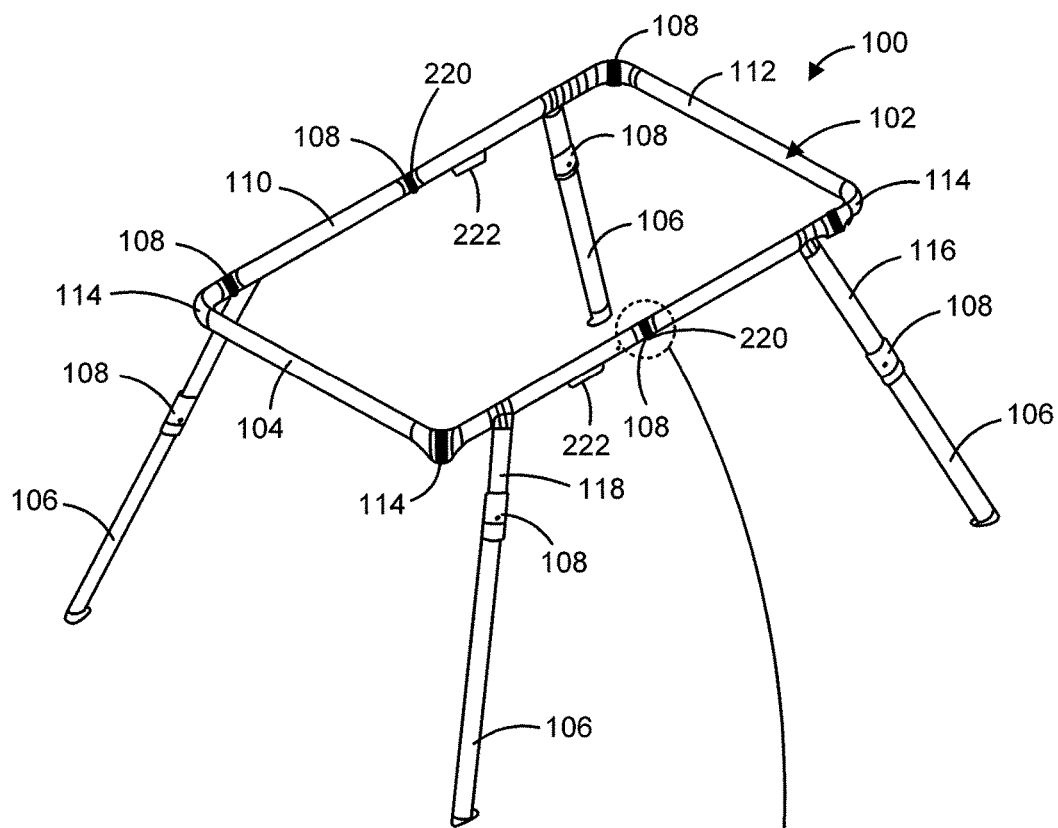
FIG. 1 shows an implementation of a collapsible device including a collapsible frame body.

FIG. 1 shows an implementation of the collapsible device 100 including a collapsible frame body 102 having a continuous rail 104 with at least one leg or extension 106 extending from the continuous rail 104. For example, as shown in FIG. 1, the continuous rail 104 can have four extensions or legs 106 that extend from the continuous rail 104 and provide support for at least the continuous rail 104.

In addition, as shown, for example, in FIG. 4, the collapsible device 100 can include one or more of a variety of shaped and sized flexible material components 303 which can be permanently or reversibly secured to the collapsible frame body 102 in order to allow the collapsible device to be configured for a variety of uses, as will be discussed in greater detail below.

Additionally, the continuous rail 104 can form a variety of shapes (i.e., rectangular, circular, square, etc.) and sizes and can include at least one hinge or joint 108 along the length of the continuous rail 104. The at least one joint 108 can, for example, segment the continuous rail 104, which can allow the continuous rail to collapse or form a variety of configurations. In addition, the at least one joint 108 can be positioned at a variety of locations along the length of the continuous rail and can be positioned in order to enable the collapsible frame body 102 to form a compact configuration in a collapsed state, such as shown in FIG. 5.

For example, in some embodiments the continuous rail can be rectangular in shape having two opposing first rails 110 and two opposing second rails 112 with the first rails 110 having a longer length that the second rails 112. Additionally, the first rails 110 and second rails 112 can be joined at their ends to form a corner 114. In some implementations, at least one corner can include a hinge or joint 108, which can assist in allowing the collapsible frame body 102 to at least one of collapse or change configurations.

In addition, at least one of the first rails 110 or the second rails 112 can include at least one hinge or joint 108 positioned along their length, which can also assist in allowing the collapsible frame body 102 to at least one of collapse or change configurations. As shown in FIG. 1, both opposing first rails 110 can include a joint 108 positioned a distance from at least one corner 114 of the continuous rail 104, such as a distance of approximately half the length of a first rail 110.

Figure 5:
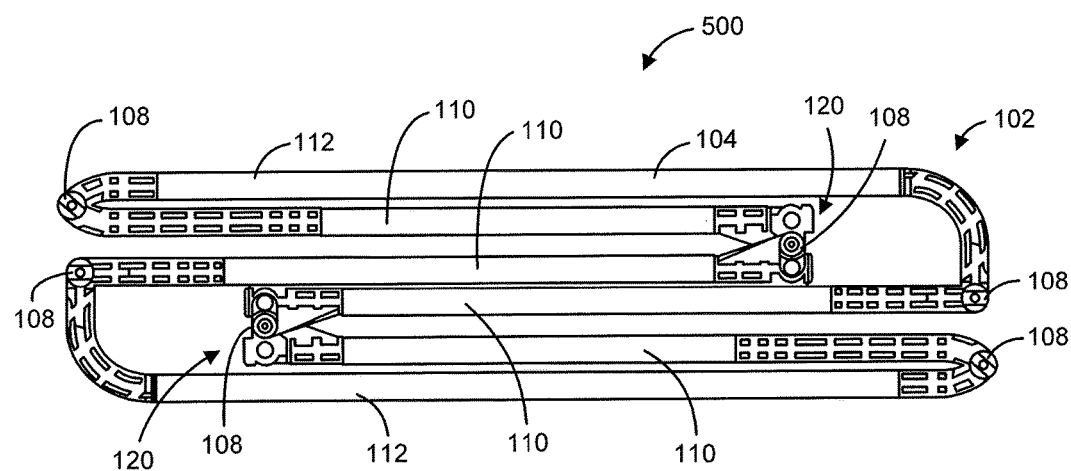
FIG. 5 shows an implementation of the continuous rail of the collapsible device in a collapsed configuration.

Additionally, at least one hinge or joint 108 can be positioned adjacent or offset from at least one corner 114, which can allow, for example, a variety of collapsed configurations, as shown in FIG. 5. For example, having at least one joint 108 positioned adjacent or offset to at least one corner 114 can allow at least the continuous rail 104 to fold into a compact configuration where the second rails 112 and one or more segments of the first rails 110 can be positioned adjacent and parallel to each other (as shown, for example, in FIG. 5) and in a configuration that has a smaller shape than when in an expanded configuration, as shown in FIG. 1.

The collapsible frame body 102 can be made out of a variety of materials, including materials that are light-weight and robust for providing support for various uses of the collapsible device, such as for supporting a child or animal. For example, the collapsible frame body 102 can be made out of a metal such as aluminum or light-weight steel. In other implementations, these components can be made of a composite material such as carbon fiber, polyvinyl carbonate, nylon, plastic, or the like. In still other implementations, various components can be made of different materials based on their function, anticipated forces to absorb, or other potential uses or forces.

Some implementations of the collapsible frame body 102 can include at least one extension 106 extending from the continuous frame 104. In addition, one or more of the extensions 106 can include a hinge or joint 108 which can allow the one or more extensions 106 to collapse or allow the collapsible device 100 to form various configurations, such as for a variety of different uses.

In addition, the joints 108 positioned along the length of the extensions 106 can be positioned at various distances along the length of the extension 106. For example, as shown in FIG. 1, a first joint 108 can be positioned along a first extension 106 at a first distance 116 and a second joint 108 can be positioned along a second extension 106 at a second distance 118 where the first distance 116 is longer than the second distance 118. This configuration can allow at least the first extension 106 and second extension 106 to collapse into a compact configuration, such as by allowing the distal segment of the first extension 106 to fold or collapse over the folded or collapsed second extension 106, as shown, for example, in FIG. 6.

Additionally, for example, the first distance 116 can be approximately one third the length of the extension 106 and the second distance can be approximately one quarter the length of the extension 106. However, any number of a variety of distances has been contemplated for positioning at least one joint along an extension 106. In some implementations, the at least one extension 106 can extend at or adjacent a corner 114 of the continuous rail 104. However, any number of extensions 106 can extend from the continuous rail 104 at a variety of locations in order to form a variety of configurations of the collapsible device 100 and provide a variety of functions.

Figure 1A:
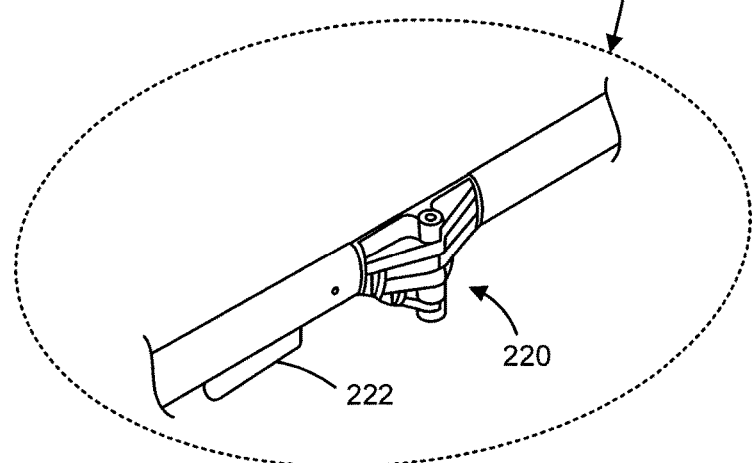
FIG. 1A shows an implementation of a locking joint, including a user-activated release mechanism.

In addition, one or more joints 108 can have a locking mechanism, including a user-activated locking mechanism, which can allow and prevent articulation of the associated joint 108. FIG. 1A shows an implementation of a locking joint 220, including a user-activated release mechanism 222, which can be positioned along the continuous rail 104, such as along at least one of the first rails 110. However, a locking joint 220 can be positioned along any part of the collapsible body 102, including one or more extensions 106, and the locking joint 220 can have a variety of configurations.

Figure 2A:
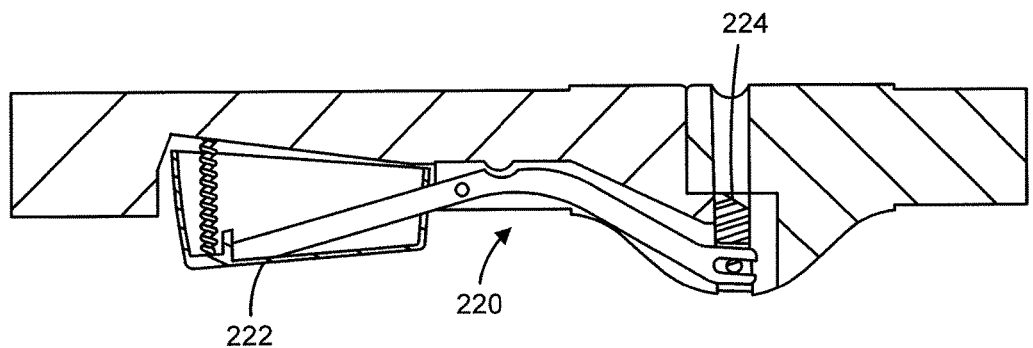
FIG. 2A shows a cross section view of the locking joint shown in FIG. 1A, in an unlocked configuration.
Figure 2B:
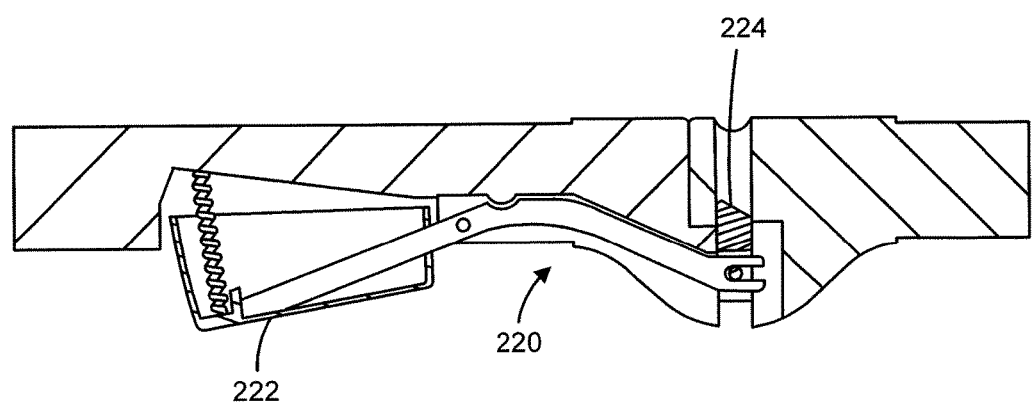
FIG. 2B shows a cross section view of the locking joint shown in FIG. 1A, in a locked configuration.

FIGS. 2A and 2B show an implementation of the locking joint 220, including the user-activated release mechanism 222 that can allow a user to engage and disengage a locking feature 224. When engaged, the locking feature 224 can prevent articulation of the locking joint 220. As such, a user can activate the release mechanism 222, such as a spring loaded push button or lever, which can disengage the locking feature 224. When disengaged, for example, the locking joint 220 can articulate along a defined or variable range of motion.

In some implementations, the locking joint 220 can be spring-loaded such that when the user-activated release mechanism 222 is not being compressed or activated, the compression spring pushes the locking feature 224, such as a pin, into a female portion of the locking joint 220 to form an engaged or locked position. Both the locking feature 224 and the female portion of the locking joint 220 can have mating angled surfaces so that the act of rotating the locking joint 220 into an extended position can cause the locking feature 224 to slide towards or into the female portion until the locking feature 224 and the female portion can become engaged. At this point, the locking feature 224 can engage or mate with the female portion and constrain the locking joint 220 from articulating or rotating back into an unlocked position.

The locking joint 220 can provide a variety of features, such as preventing unintended collapsing of the collapsible frame body 102, which can improve the safety and stability of the collapsible device 100. For example, during use, a user can allow the locking feature 224 to be engaged in order to prevent the locking joint 220 from unintentionally articulating and causing the collapsible frame body 102 to change configuration or collapse. In addition, when the user wants to transport the collapsible device, the user can disengage the locking feature 224, such as by pushing down on the release mechanism 222, in order to allow the locking joint 220 to articulate and allow the collapsible frame body 102 to collapse.

Figure 3A:
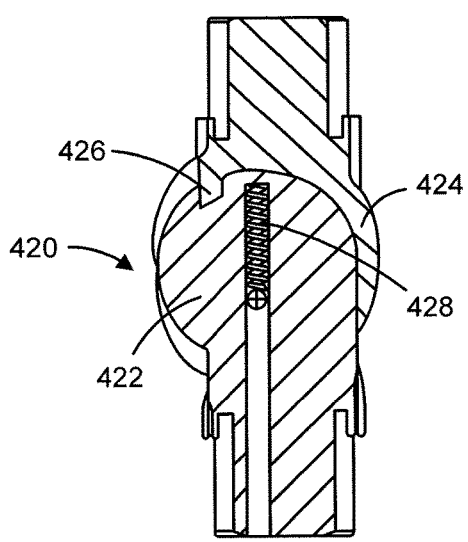
FIG. 3A shows an implementation of a locking joint in an extended and locked configuration.
Figure 3B:
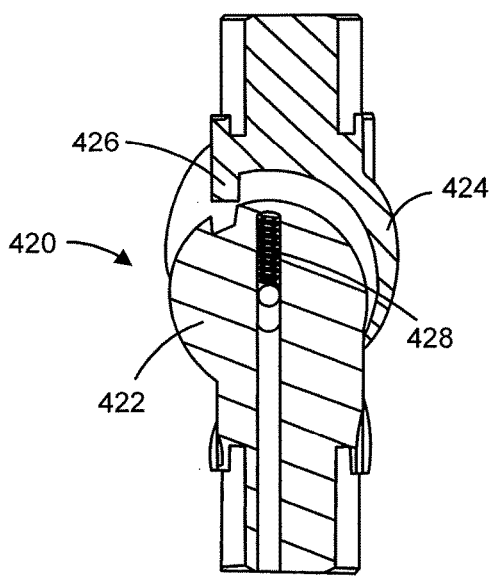
FIG. 3B shows the locking joint in FIG. 3A where the locking feature is disengaged.
Figure 3C:
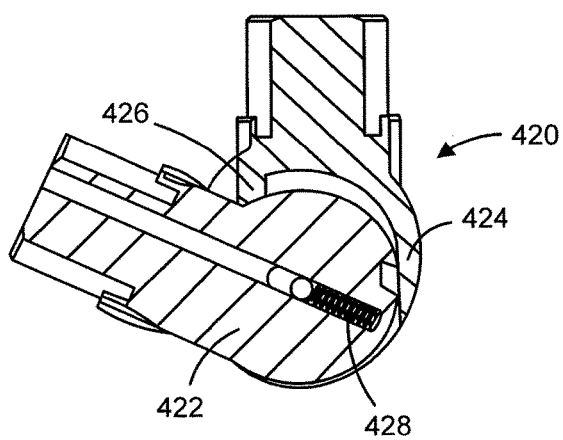
FIG. 3C shows the locking joint in FIG. 3A in an unlocked and collapsed configuration.

FIGS. 3A-3C illustrate another implementation of a locking joint 420 which can be positioned along at least one extension 106 for allowing the extension 106 to collapse or form a variety of configurations. However, the locking joint 420 shown in FIGS. 3A-3C can also be positioned at a variety of positions along the collapsible frame body 102.

For example, the locking joint 420 can include a male joint element 422, a female joint element 424 and a locking feature 426. The locking feature 426 can be configured to lock the position of the male joint element 422 relative to the female joint element 424, which can prevent articulation of the locking joint 420, as shown in FIG. 3A. In addition, when the locking feature 426 is disengaged, such as in FIG. 3B, the male joint element 422 can be free to move or articulate relative to the female joint element 424, as in FIG. 3C.

The locking joint 420 can include a compression spring 428, such as in the leg of the male hinge element 422, which can be compressed and allow the locking feature 420 to become disengaged, as in FIG. 3B. For example, the compression spring 428 can be engaged or compressed by a user pulling on the extension segment associated with the male hinge element 422. Once the user has pulled on the extension segment associated with the male hinge element 422, the user can then move or collapse the extension 106 into a variety of configurations, including the collapsed configuration shown in FIG. 6.

In addition, the locking feature 426 can have a variety of features and can be located on any part of the locking joint 420. Additionally, the locking joint 420 can have a variety of ranges of motion, including adjustable ranges of motion.

Furthermore, any number of locking joints 220 and 420 can be positioned along the collapsible device 100, including along any adaptable feature, as will be discussed in greater detail below. In addition, any one or more joints 108, including locking joints 220 and 420, of the collapsible device can have one or more of a variety of ranges of motion. The ranges of motion can assist in controlling or restraining the configurations that the collapsible frame 102 can form, which can provide improved safety and stability.

For example, one or more joints 108 positioned at one or more corners 114 can be configured to have a range of motion or articulate through a range of approximately 90 degrees. By limiting the range of motion of one or more corner 114 joints 108, stability of the collapsible frame can be maintained when at least in the expanded configuration, as shown in FIG. 1. In addition, the one or more joints 108, including locking joints 220 and 420, positioned along the continuous rail 104 can have a range of motion of approximately 180 degrees when unlocked.

Figure 4:
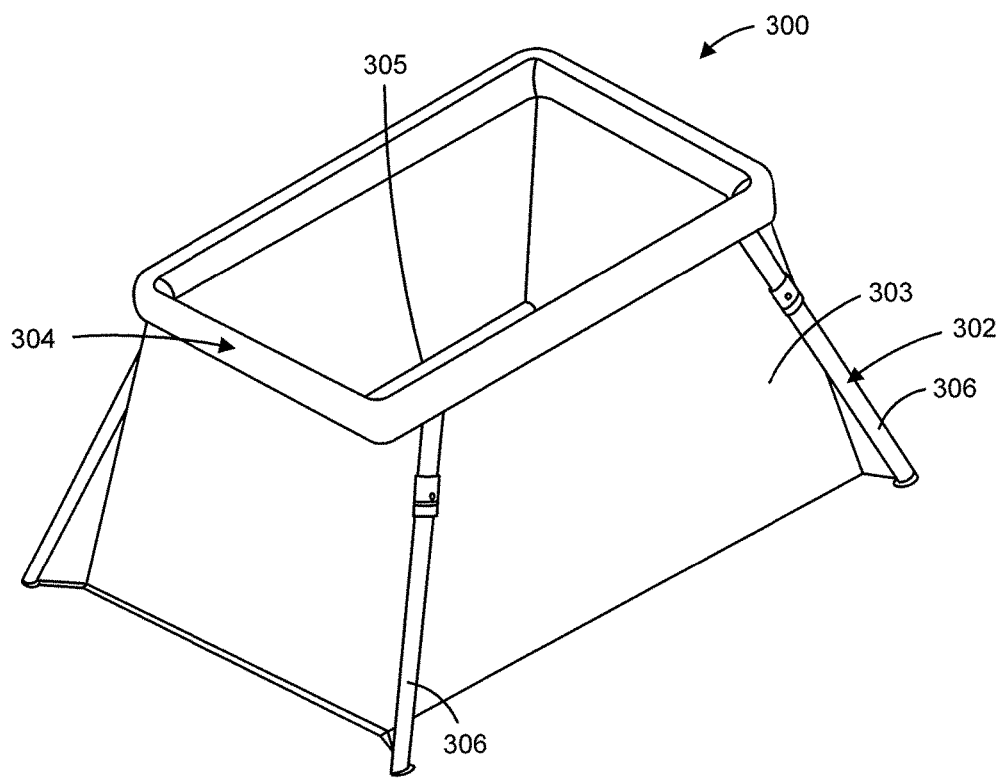
FIG. 4 shows an implementation of a collapsible device having a flexible material component secured to the collapsible frame body.

FIG. 4 shows an implementation of a collapsible device 300 having a flexible material component 303 secured to the collapsible frame body 102. The flexible material can have a variety of shapes and sizes and can permanently or reversibly secure to the collapsible frame in a variety of ways. In addition, the flexible material component can be made out of one or more of a variety of materials, including nylon, polyester, cotton, any of a variety of synthetic or natural textile or mesh fabric, or an assembly of multiple textile types.

For example, the flexible material component 303 can be shaped and sized to secure to the collapsible frame body 302 of the collapsible device 300 and form at least a partial enclosure or containment area, such as for a child. In addition, the containment area can consists of a base 305, the bottom of which can rest on the ground. The base 305 can be connected to a mostly vertical mesh perimeter that rises up from the base 305 and extends to the continuous rail 304 of the collapsible frame body 302. The combination of the base 305 and the mostly vertical mesh perimeter can create a containment area, such as for the child.

For example, the flexible material component 303 can assemble to the continuous rail 304 by securing one or more securing elements, such as a zipper, around at least a part of the continuous rail 304. However, any number of a variety of securing elements, including snap-buttons, Velcro or the like can be used.

In addition, at least a part of the flexible material component 303, such as the vertical mesh perimeter, can secure to one or more extensions 306. For example, one or more lower corners of the flexible material component 303 can have connectors that fasten to the base of one or more extensions 306. The connectors can secure the flexible material component 303 to one or more extensions 306 by, for example, securing or sliding up into the distal end of the one or more extrusions 306. These connectors could also permanently or reversibly attach to the one or more extensions 306 in a variety of ways. These connectors may also act as feet for the one or more extensions 306.

In some implementations, the base 305 can include a mattress that can be constructed out of a padding material for comfort. For example, the mattress can be made out of a foam sheet of approximately 1 inch thick, and can be approximately ¼ to 4 inches thick or more. In addition, the base 305 can include a rigid element which can be positioned during use under the mattress, such as for providing additional support for the mattress. At least one of the rigid element and mattress can have one or more creases or joints that can assist in collapsing or folding the rigid element and mattress, such as for allowing improved transport in a compact configuration.

Figure 6:
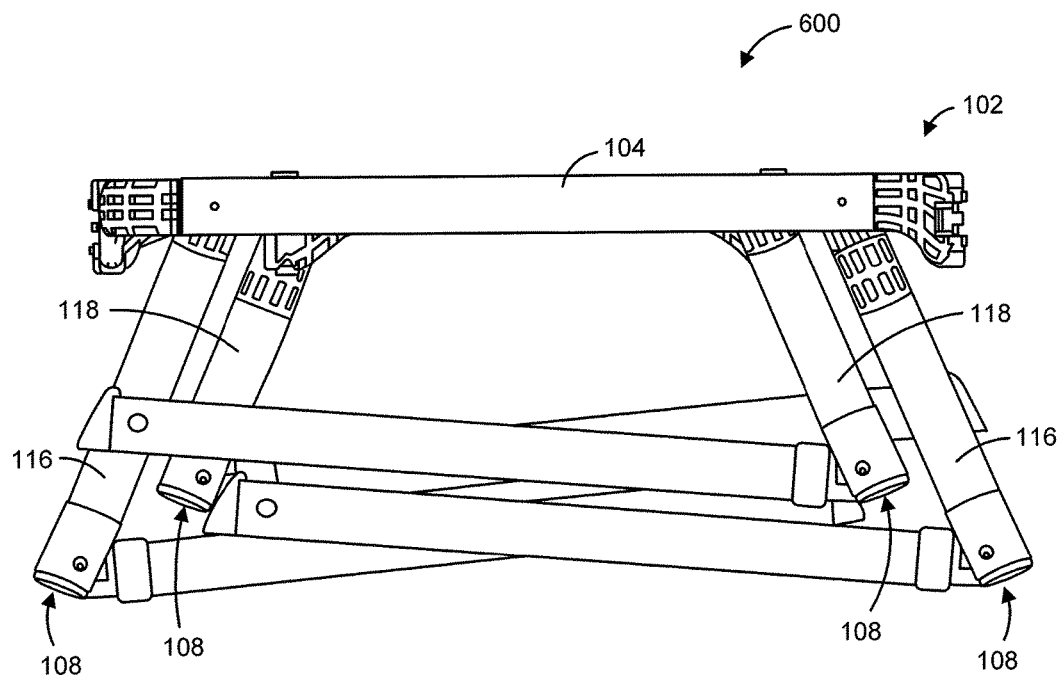
FIG. 6 shows an implementation of more than one extension of the collapsible device in a collapsed configuration.

FIG. 5 shows an implementation of the continuous rail 104 of the collapsible device 100 in a collapsed configuration 500. In addition, FIG. 6 shows an implementation of more than one extension 106 of the collapsible device 100 in a collapsed configuration 600. Some implementations of the collapsible device 100 can allow the continuous rail 104 to conform into the collapsed configuration 500 and the more than one extension 106 to form the collapsed configuration 600 such that the collapsible device 100 can form a compact and easily transportable configuration.

In addition, the collapsible device 100 can include a variety of transporting equipment or accessories, such as travel bags, which are sized and shaped to contain the collapsible device 100. In addition, one or more accessories, such as a flexible material component 303 can be formed into a compact configurations and transported along with the collapsible device 100, including within one or more transporting equipment or accessories.

Figure 7A:
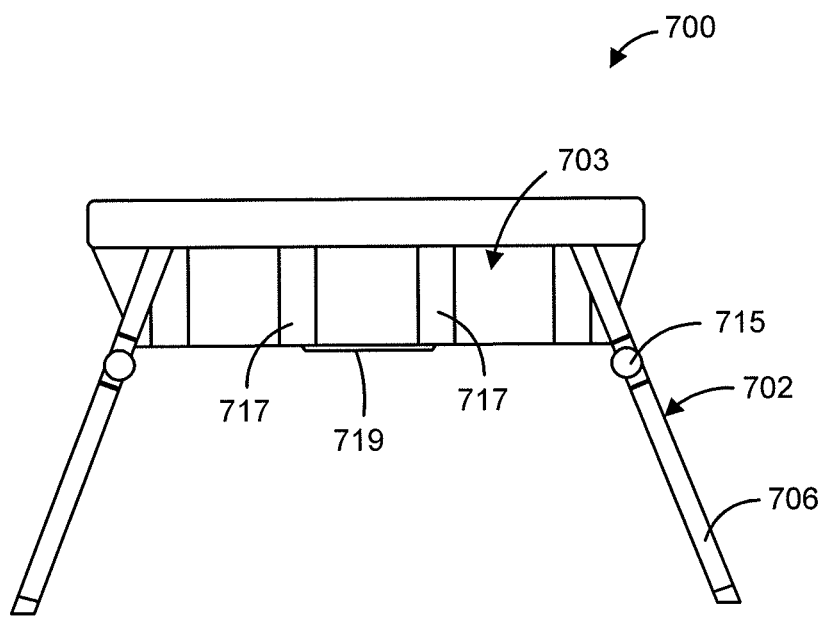
FIG. 7A shows an implementation of the collapsible device including a material component having at least one support strap for providing additional strength or support.

FIG. 7A shows an implementation of the collapsible device 700 including a material component 703 having at least one support strap 717 for providing additional strength or support. The at least one support strap 717 can extend in any one or more directions along the flexible material component 703. For example, the one or more support straps 717 can be made out of a material that is compliant enough to allow the flexible material component 703 to collapse into a compact configuration, such as for easy transport, and can also provide additional support and strength to the flexible material component 703. The additional support and strength can also improve the safety of the collapsible device 700 by assisting in supporting the object, such as a child or animal, being at least partially contained or supported by the collapsible device 700.

As shown in FIG. 7A, more than one support strap 717 can extend across the flexible material component 703 that is configured, for example, to provide an at least partially enclosed sleeping area for a child. In addition, the collapsible device 700 can be configured similar to a bassinet for suspending a child in the flexible material component 703. In this configuration, the support straps 717 can assist the material comprising the flexible material component 717 with supporting at least the child.

In addition, as shown in FIG. 7A, one or more extensions 706 can include a height adjustment feature 715 which can allow a user to adjust the length of the one or more extensions 706. Additionally, any number of height adjustment features 715 can be included in the collapsible device 700 for allowing a user to adjust one or more dimensions of the collapsible device 700, including the height.

Figure 7B:
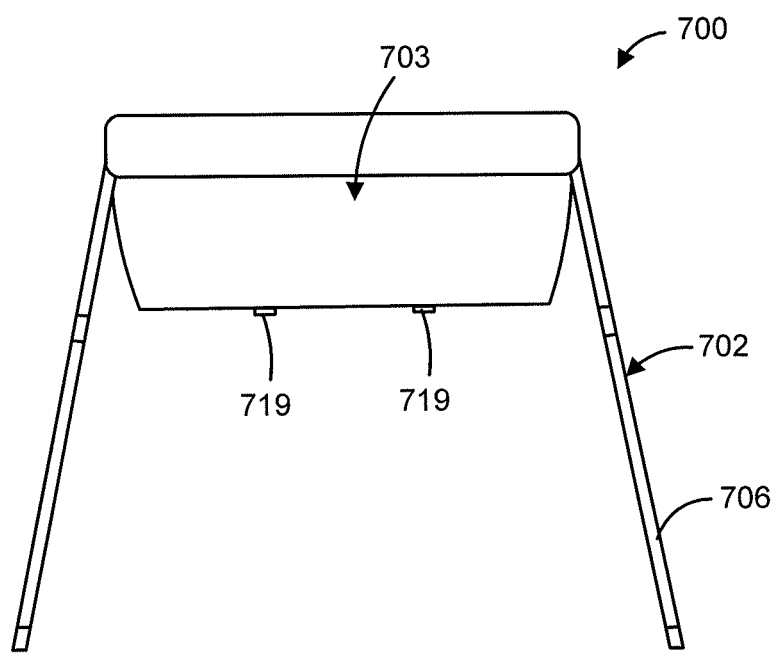
FIG. 7B shows an end view of the flexible material component shown in FIG. 7A showing one or more rigid components for providing additional support.

In some implementations, as shown in FIG. 7B, the flexible material component 703 can include one or more rigid components 719 for providing additional support. For example, the one or more rigid components 719 can assist in maintaining a configuration of the flexible material component 703, such as for providing a generally flat bottom surface where a child can sleep. The one or more rigid components 719 can also improve safety of the device by preventing unwanted collapsing of the flexible material component 703 which could harm a child contained in the flexible material component.

Figure 8:
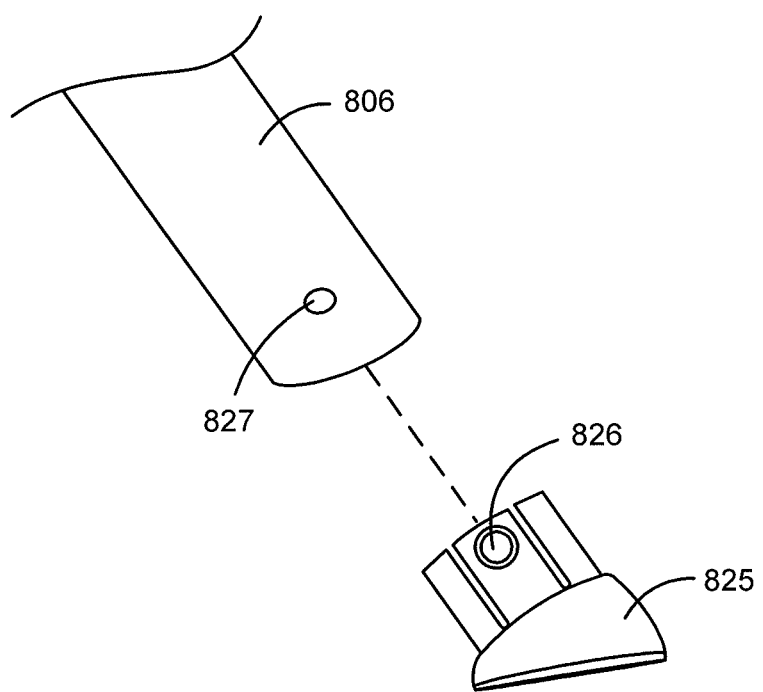
FIG. 8 shows an implementation of a distal end of an extension that is configured to permanently or reversibly adapt one or more of a variety of adaptable features.

FIG. 8 shows an implementation of a distal end of an extension 806 that is configured to permanently or reversibly adapt one or more of a variety of adaptable features 825. As shown in FIG. 8, the adaptable feature 825 can be secured to the distal end of the extension 806 by mating a locking feature 826 of the adaptable feature 825 with a locking feature 827 of the extension 806. The locking features 826 and 827 can interact or mate in order to allow permanent or reversible engagement between the extension 806 and the adaptable feature 825.

Although the adaptable feature is shown as being adapted to the distal end of an extension 806, any one or more adaptable features 825 can be adapted to a variety of features or parts of the collapsible frame body 102. In addition, the adaptable features 825 can vary in size and configuration in order to allow the collapsible device to have a variety of characteristics and functions.

For example, as shown in FIG. 8, the adaptable feature 825 can have an angled foot configuration. The angled foot configuration of the adaptable feature 825 can have, for example, a variety of different bottom surfaces for providing a variety of traction and engagement with various surfaces and terrains.

Figure 9:
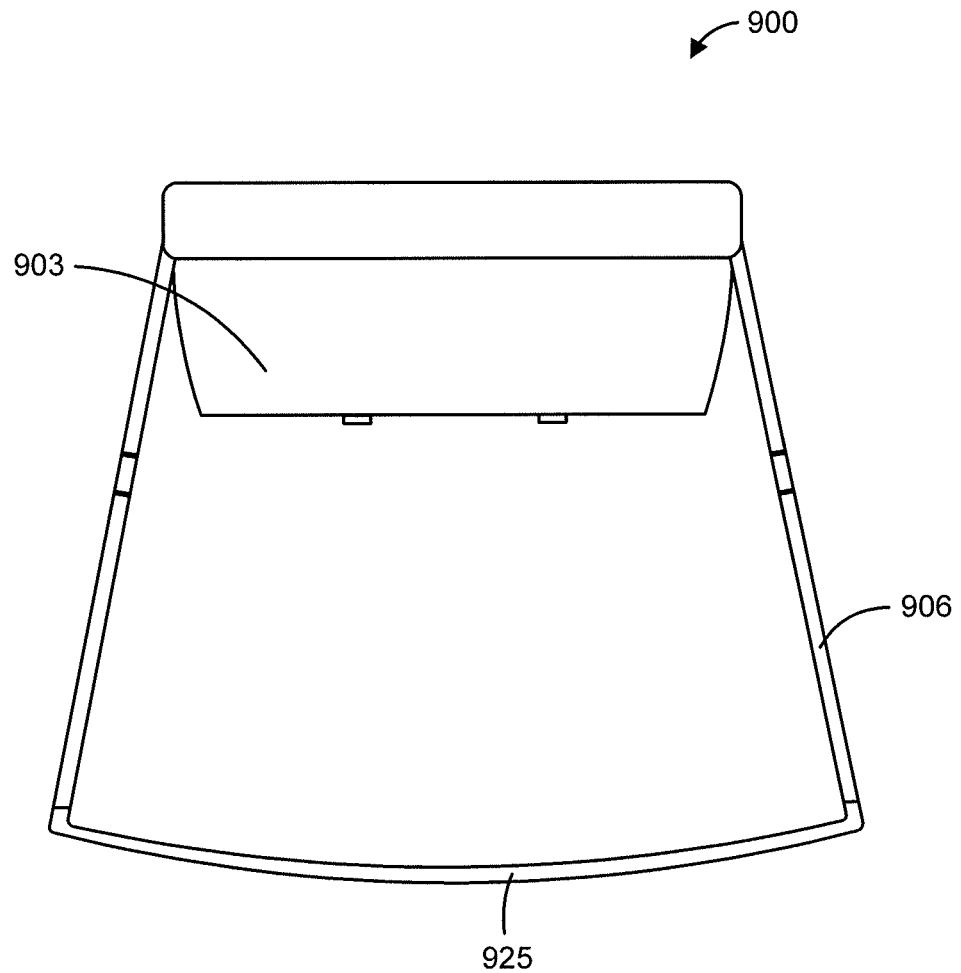
FIG. 9 shows an implementation of a rocker adapter adapted to the collapsible frame body.

FIG. 9 shows an implementation of a collapsible device 900 having at least one rocker adapter 952 adapted to the distal end of at least one extension 906. The rocker adapter 925 can be permanently or reversibly adapted to the collapsible device 900 and can provide a variety of characteristics, including the ability to allow the collapsible device to create a rocking motion. This can allow, for example, a child contained in the flexible material component 903 to be rocked in a side-to-side motion. In addition, the rocker adapter 925 can have a number of configurations and can adapt such that one or more adapted rocker adapters 925 can create a variety of rocking motions, including either front-to-back or side-to-side rocking motions.

Figure 10A:
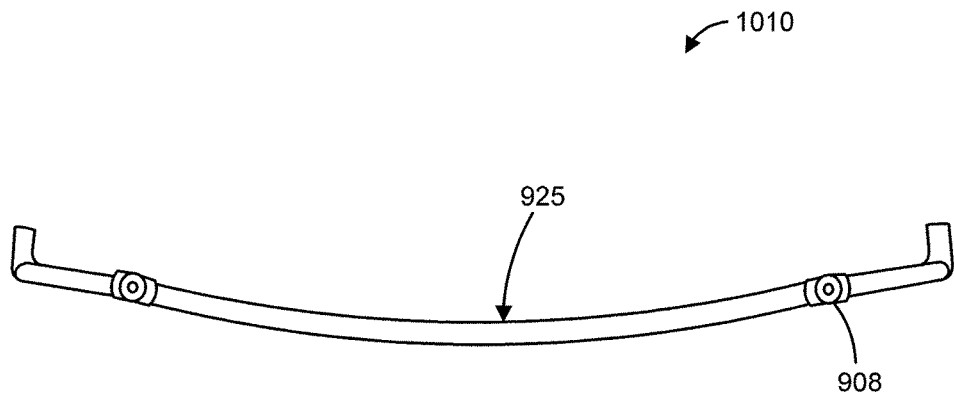
FIG. 10A shows the rocker adapter shown in FIG. 9 in an extended configuration.
Figure 10B:
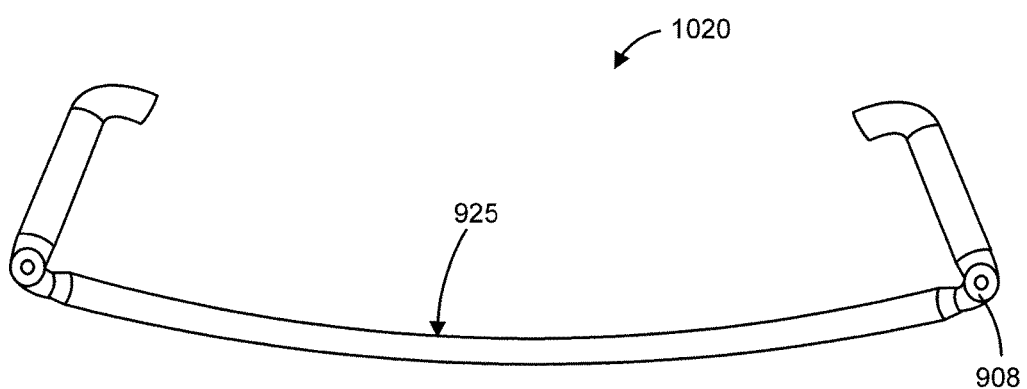
FIG. 10B shows the rocker adapter shown in FIG. 9 in a collapsed configuration.

FIGS. 10A and 10B show an implementation of the rocker adapter 925 having at least one hinge or joint 908 which can allow the rocker adapter to collapse or change configurations. For example, the rocker adapter 925 can extend into an extended configuration 1010, as in FIG. 10A, for allowing the rocker adapter 925 to adapt to a pair of extensions, as shown in FIG. 9. In addition, the rocker adapter 925 can fold or collapse into a compact configuration 1020, as in FIG. 10B, for allowing the rocker adapter 925 to be easily transported.

Figure 11A:
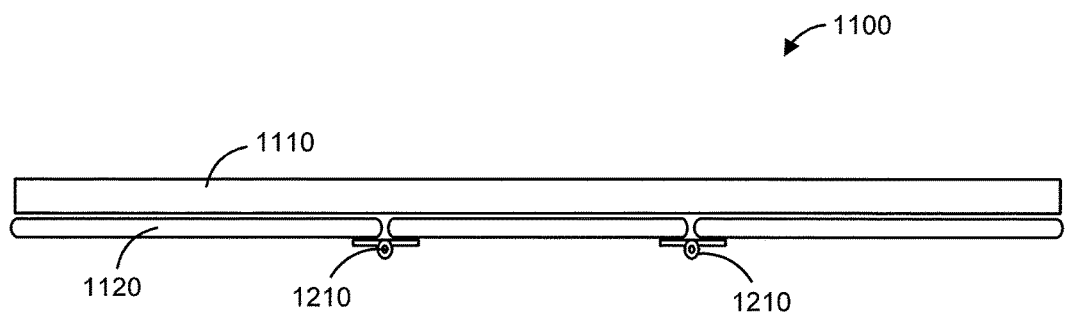
FIG. 11A shows an implementation of a foldable base in an extended configuration.
Figure 11B:
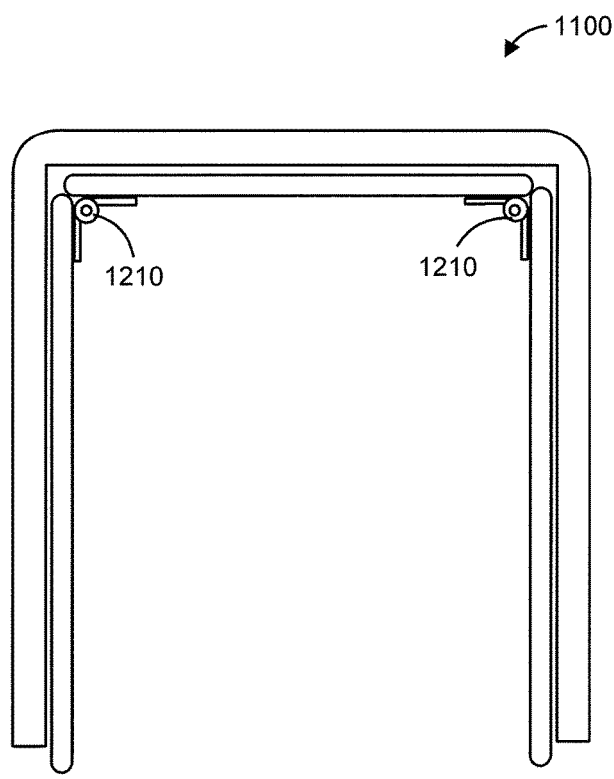
FIG. 11B shows an implementation of a foldable base in a collapsed or folded configuration.

FIGS. 11A and 11B show an implementation of a foldable base 1100, which can be adapted to any number of collapsible frame bodies or flexible material components. For example, the foldable base 1100 can provide a secure and comfortable sleeping area for a child and can be collapsible for improved transport. The foldable base 1100 can include one or more parts, including a foldable mattress 1110 and a hinged platform 1120. For example, the foldable mattress 1110 can provide a comfortable sleeping area and the hinged platform 1120 can provide support for the foldable mattress 1110.

FIG. 11A shows the foldable base 1100 in an extended configuration showing the foldable mattress 1110 positioned over the hinged platform 1120. The hinged platform 1120 can include at least one limited articulation range hinge 1210 which can limit the direction and range of motion that the hinged platform 1120 can fold. For example, as shown in FIG. 11B, the at least one hinge 1210 can allow the hinged platform 1120 to fold into a square or at least one approximately 90 degree configuration. In addition, the at least one hinge 1210 can allow the hinged platform 1120 to fold away from the foldable mattress 1110, as shown in FIG. 11B. This can prevent the foldable base 1100 from unwanted folding, such as when a child is laying on the foldable base 110. As such, when the foldable base 1100 is in an extended configuration while supported on a support structure a child laying on the foldable base 1100 cannot cause the foldable base 1100 to form the folded or collapsed configuration, as shown in FIG. 11B.

Figure 12A:
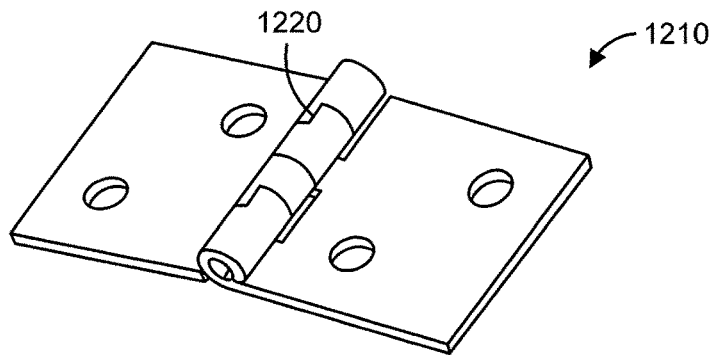
FIGS. 12A-12C shows an implementation of a limited articulation range hinge having at least one articulation range limiting feature.
Figure 12B:
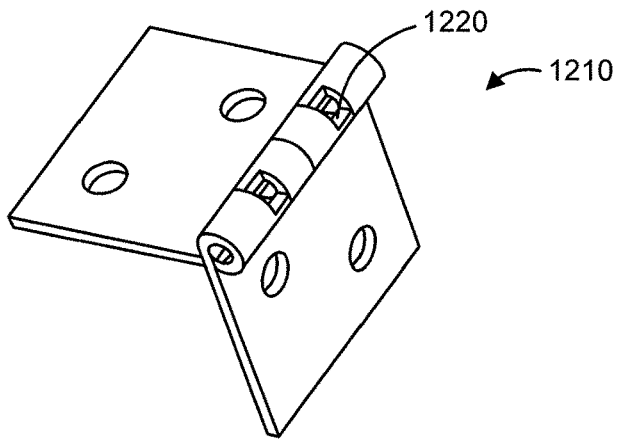
Figure 12C:
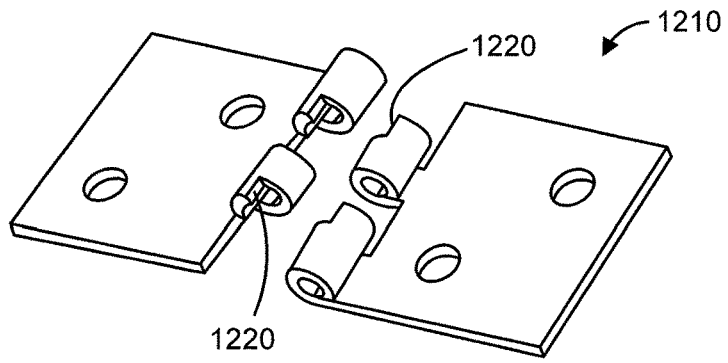

FIGS. 12A-12C shown an implementation of a limited articulation range hinge 1210 having at least one articulation range limiting feature 1220. The articulation range limiting feature 1220, as shown in FIG. 12C, can include at least one tongue feature that allows only limited range of motion for improved safety, such as preventing unwanted folding of the foldable base 1100, as discussed above. For example, when the collapsible device is used as a bassinet, the foldable base can provide a support structure for a child to lie on and the limited range hinge 1210 can prevent unwanted folding of the foldable base 1100 that could harm the child.

For example, FIG. 12A shows the limited articulation range hinge 1210 in an expanded configuration where the range limiting features 1220 are mated against each other in a first position. In addition, FIG. 12B show the limited articulation range hinge 1210 in a folded or collapsed configuration where the range limiting features 1220 are mated against each other in a second position. Additionally, the range limiting features 1220 can limit the movement or folding of the hinge between the extended configuration, shown in FIG. 12A, and the folded or collapsed configuration, shown in FIG. 12B.

Although a few embodiments have been described in detail above, other modifications are possible. Other embodiments may be within the scope of the following claims.

The invention claimed is:

1. A collapsible device, comprising:
    a collapsible frame body including:
        a continuous rail having at least first and second corner continuous rail joints that segment the continuous rail into segments, the continuous rail comprising at least first and second corners, wherein the first corner continuous rail joint is located at the first corner and the second corner continuous rail joint is located at a position offset and adjacent to the second corner, thereby allowing the continuous rail to transition between a first extended configuration in which the first and second corner continuous rail joints are in a plane and a first collapsed configuration in which the first and second corner continuous rail joints have folded in the plane such that the segments of the continuous rail are positioned adjacent each other;
        a first extension extending from the continuous rail, the first extension including a first proximal part and a first distal part with a first extension joint positioned a first distance from the continuous rail and between the first proximal part and the first distal part, the first extension joint allowing the first extension to transition between a second collapsed configuration and a second extended configuration, wherein the second extended configuration includes the first proximal part being collinear with the first distal part, and wherein the second collapsed configuration includes the first proximal part being angled relative to the first distal part;
        a second extension extending from the continuous rail, the second extension including a second proximal part and a second distal part with having a second extension joint positioned a second distance from the continuous rail and between the second proximal part and the second distal part, the first extension joint allowing the second extension to transition between a third collapsed configuration and a third extended configuration, wherein the third extended configuration includes the second proximal part being collinear with the second distal part, and wherein the third collapsed configuration includes the second proximal part being angled relative to the second distal part, and wherein the first distance is shorter than the second distance;
        a flexible material component configured to reversibly secure to at least a part of the collapsible frame body and provide the at least partial containment; and
        a foldable base configured to reversibly mate with the flexible material.

2. The device of claim 1, wherein the continuous rail is rectangular in shape with two opposing first rails and two opposing second rails with the first rails having a length that is longer than the second rails.

3. The device of claim 2, wherein each of the first rails include a first continuous rail joint which segment the first rails and allow the first rails to transition between a third collapsed configuration and a third extended configuration.

4. The device of claim 3, wherein the first continuous rail joints include a locking mechanism configured to be activated by a user and allow the user to lock and unlock the first continuous rail joints.

5. The device of claim 1, wherein a third corner includes a third corner continuous rail joint located at the third corner and a fourth corner includes a fourth corner continuous rail joint located at a position offset and adjacent to the fourth corner of the continuous rail.

6. The device of claim 1, wherein a distal end of the first extension and/or the second extension is configured to couple to a rocker adapter or an adaptable foot.

7. A method comprising;
    providing a collapsible device that provides at least partial containment, wherein the collapsible device includes a collapsible frame body including:
        a continuous rail having at least first and second corner continuous rail joints that segment the continuous rail into segments, the continuous rail comprising at least first and second corners, wherein the first corner continuous rail joint is located at the first corner, the second corner continuous rail joint is located at a position offset and adjacent to the second corner thereby allowing the continuous rail to transition between a first extended configuration in which the first and second corner continuous rail joints are in a plane and a first collapsed configuration in which the first and second corner continuous rail joints have folded in the plane such that the segments of the continuous rail are positioned adjacent to each other;

a first extension extending from the continuous rail, the first extension including a first proximal part and a first distal part with a first extension joint positioned a first distance from the continuous rail and between the first proximal part and the first distal part, the first extension joint allowing the first extension to transition between a second collapsed configuration and a second extended configuration, wherein the second extended configuration includes the first proximal part being collinear with the first distal part, and wherein the second collapsed configuration includes the first proximal part being angled relative to the first distal part;

a second extension extending from the continuous rail, the second extension including a second proximal part and a second distal part with having a second extension joint positioned a second distance from the continuous rail and between the second proximal part and the second distal part, the first extension joint allowing the second extension to transition between a third collapsed configuration and a third extended configuration, wherein the third extended configuration includes the second proximal part being collinear with the second distal part, and wherein the third collapsed configuration includes the second proximal part being angled relative to the second distal part, the first distance being shorter than the second distance;

a flexible material component configured to reversibly secure to at least a part of the collapsible frame body and provide the at least partial containment; and a foldable base configured to reversibly mate with the flexible material.

8. The method of claim 7, wherein the continuous rail is rectangular in shape with two opposing first rails and two opposing second rails with the first rails having a length that is longer than the second rails.

9. The method of claim 8, wherein each of the first rails include a first continuous rail joint which segment the first rails and allow the first rails to transition between a third collapsed configuration and a third extended configuration.

10. The method of claim 9, wherein the first continuous rail joints include a locking mechanism configured to be activated by a user and allow the user to lock and unlock the first continuous rail joints.

11. The method of claim 7, wherein a third corner includes a third corner continuous rail joint located at the third corner and a fourth corner includes a fourth corner continuous rail joint located at a position offset and adjacent to the fourth corner of the continuous rail.

12. The method of claim 7, wherein a distal end of the first extension and/or the second extension is configured to couple to a rocker adapter or an adaptable foot.

* * * * *